United States Patent
Rastgar et al.

(10) Patent No.: US 9,760,791 B2
(45) Date of Patent: Sep. 12, 2017

(54) METHOD AND SYSTEM FOR OBJECT TRACKING

(71) Applicant: SONY CORPORATION, Tokyo (JP)

(72) Inventors: Houman Rastgar, Campbell, CA (US); Alexander Berestov, San Jose, CA (US)

(73) Assignee: SONY CORPORATION, Tokyo (JP)

( * ) Notice: Subject to any disclaimer, the term of this patent is extended or adjusted under 35 U.S.C. 154(b) by 36 days.

(21) Appl. No.: 14/841,892

(22) Filed: Sep. 1, 2015

(65) Prior Publication Data
US 2017/0061229 A1    Mar. 2, 2017

(51) Int. Cl.
*G06K 9/46*    (2006.01)
*G06K 9/00*    (2006.01)
*G06K 9/52*    (2006.01)
*G06K 9/62*    (2006.01)
*G06T 7/20*    (2017.01)
*G06T 7/00*    (2017.01)

(52) U.S. Cl.
CPC ............ *G06K 9/46* (2013.01); *G06K 9/00711* (2013.01); *G06K 9/4652* (2013.01); *G06K 9/52* (2013.01); *G06K 9/6215* (2013.01); *G06T 7/0065* (2013.01); *G06T 7/20* (2013.01); *G06K 2009/4666* (2013.01)

(58) Field of Classification Search
None
See application file for complete search history.

(56) References Cited

U.S. PATENT DOCUMENTS

| | | | |
|---|---|---|---|
| 4,719,584 A | 1/1988 | Rue et al. | |
| 8,696,458 B2 | 4/2014 | Foxlin et al. | |
| 9,183,459 B1* | 11/2015 | Zhang | G06K 9/52 |
| 2008/0010273 A1* | 1/2008 | Frank | G06F 17/30241 |
| 2013/0064427 A1* | 3/2013 | Picard | G01S 5/163 382/103 |
| 2013/0272570 A1* | 10/2013 | Sheng | G06F 3/017 382/103 |
| 2014/0085545 A1* | 3/2014 | Tu | G06K 9/00771 348/659 |
| 2015/0178943 A1* | 6/2015 | Li | G06K 9/00624 382/103 |
| 2016/0343146 A1* | 11/2016 | Brown | G06T 7/2033 |

* cited by examiner

*Primary Examiner* — Delomia L Gilliard
(74) *Attorney, Agent, or Firm* — Chip Law Group (57) ABSTRACT

Various aspects of a method and system for object tracking are disclosed herein. The method comprises computation of an overlap value between a first bounding box and a second bounding box, associated with an object in an image frame of a video stream. The overlap values are utilized to track the object in the video stream. The first bounding box encompasses at least a partial first portion of an object. The second bounding box encompasses at least a partial second portion of the object. A first score associated with the first bounding box and a second score associated with the second bounding box is computed based on a comparison of the computed overlap value with a pre-defined threshold value. The first bounding box is updated to a new bounding box that at least partially encompasses the object, based on the computed first score and the computed second score.

20 Claims, 6 Drawing Sheets

METHOD AND SYSTEM FOR OBJECT TRACKING

FIELD

Various embodiments of the disclosure relate a method and system for object tracking. More specifically, various embodiments of the disclosure relate to a method and system for object tracking based on two trackers.

BACKGROUND

Proliferation of high-powered computing systems, availability of high-quality and inexpensive video-capturing devices, and the increased need for automated video analysis, has led to immense advancements in the field of visual object tracking. Visual object tracking may be pertinent in various tasks, such as automated surveillance, motion-based object recognition, vehicle navigation, video indexing, human-computer interaction, and/or traffic monitoring.

Visual object tracking may utilize various visual object tracking algorithms (hereafter referred to as, "trackers"), to estimate a trajectory of a target object, as the target object moves in an image plane of a scene recorded by a video-capturing device, such as a video camera. A tracker may assign consistent labels to the target object that may be visible in different video frames that correspond to the captured scene. The tracker may be initialized with a template image of the target object in an initial video frame. The tracker may learn an appearance of the object, based on the template image. Based on the learned appearance, the tracker searches for the object in the subsequent video frames. The tracker may utilize multiple image-processing algorithms and/or computer-vision algorithms, which may be based on various parameters. Examples of such parameters may include feature representations, search strategies, motion models, number of free parameters, and/or the like.

In most realistic tracking situations, the initialization template does not contain enough information for the tracker to be able to recognize all possible appearances of the object of interest. As a result of this, the tracker may drift away from the correct location due to a sudden change in appearance of the tracked object. In such scenarios, the tracker may lose the target object as it may not be able to adapt quickly enough to be able to handle the variations in the appearance over a period of time of the target object. In certain other scenarios, trackers that adapt quickly to the target object may demand huge computational resources and pre-learning of the various possible appearances of the target object throughout the captured scene.

In other scenarios, a combination of multiple trackers to track the target object may be utilized. However, the existent methods of combinations of multiple trackers may work only on specific types of tracking algorithms, such as Bayesian trackers. Further, human intervention may be required when a drift is detected in one or more trackers (of the multiple trackers) used to track the target object. Furthermore, existent methods require information, such as confidence maps, for each individual tracker to combine the output (of the multiple trackers) used to track the target object.

Furthermore, current methods to combine multiple trackers may use a passive-fusion method where the trackers do not interact with each other. Such a passive method may be based on a consensus of the multiple trackers, and/or other sampling strategies, to reconcile the output of the multiple trackers. Also, some trackers (of the multiple trackers) may be specific to handle certain scenes while other trackers may not handle such scenes. Therefore, a flexible and generic method, which may be applied to at least two combined trackers with complementary properties, may be desired so that combined trackers may result in an overall improved quality of tracked output of the video stream.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

A method and a system for object tracking, substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

The following described implementations may be found in disclosed method and system for object tracking in an image frame of a video stream. Exemplary aspects of the disclosure may include a method implemented in an electronic device. The method may include computation of an overlap value between a first bounding box and a second bounding box, associated with an object in an image frame of a video stream. The first bounding box may encompass at least a partial first portion of an object and the second bounding box may encompass at least a partial second portion of the object. The first bounding box and the second bounding box may be utilized to track the object in the video stream. Further, a first score associated with the first bounding box and a second score associated with the second bounding box may be computed based on a comparison of the computed overlap value with a pre-defined threshold value. Further, the first bounding box may be updated to a new bounding box that may at least partially encompass the object based on the computed first score and the computed second score.

In accordance with an embodiment, an average value of a first set of parameters associated with the first bounding box and a second set of parameters associated with the second bounding box may be determined, when the computed overlap value between the first bounding box and the second bounding box exceeds a pre-defined threshold value. The first set of parameters or the second set of parameters may comprise location information, size information, and/or orientation information.

In accordance with an embodiment, a third portion of the object may be extracted from the image frame of the video stream that corresponds to the determined average value of first set of parameters and the second set of parameters. In accordance with an embodiment, an object model of the object may be maintained and updated, based on the content of the third portion. The object model of the object may be updated when the number of count instances (of the computed overlap value is higher than the pre-defined threshold value) by a pre-defined number.

In accordance with an embodiment, the first score associated with the first bounding box and the second score associated with the second bounding box may be computed based on a comparison of the computed overlap value with a pre-defined threshold value. The first score and the second score may be computed when the computed overlap value between the first bounding box and the second bounding box is lower than the pre-defined threshold value.

In accordance with an embodiment, the first score associated with the first bounding box may be computed based on a motion consistency value. The motion consistency value may be computed between the first bounding box and one or more of previous instances of the first bounding box in one or more previous image frames of the video stream.

In accordance with an embodiment, the first score associated with the first bounding box may be computed based on a visual similarity value. The visual similarity value may be computed between the object and one or more previous instances of the first bounding box in one or more previous image frames of the video stream.

In accordance with an embodiment, the second score associated with the second bounding box may be computed based on a motion consistency value. The motion consistency value may be computed between the second bounding box and one or more of previous instances of the second bounding box in one or more previous image frames of the video stream.

In accordance with an embodiment, the second score associated with the second bounding box may be computed based on a visual similarity value. The visual similarity value may be computed between the object and one or more previous instances of the second bounding box in one or more previous image frames of the video stream. In accordance with an embodiment, the first bounding box may be updated to a new bounding box that may at least partially encompass the object, based on the computed first and the computed second scores. The first bounding box may be updated when the first score is lower than the second score.

In accordance with an embodiment, the object may be tracked based on one or more attributes of the object, wherein the one or more attributes may comprise color or depth information of the object in the image frame. In accordance with an embodiment, the first bounding box may be computed by use of a first tracker algorithm. The second bounding box may be computed by use of a second tracker algorithm.

Figure 1:
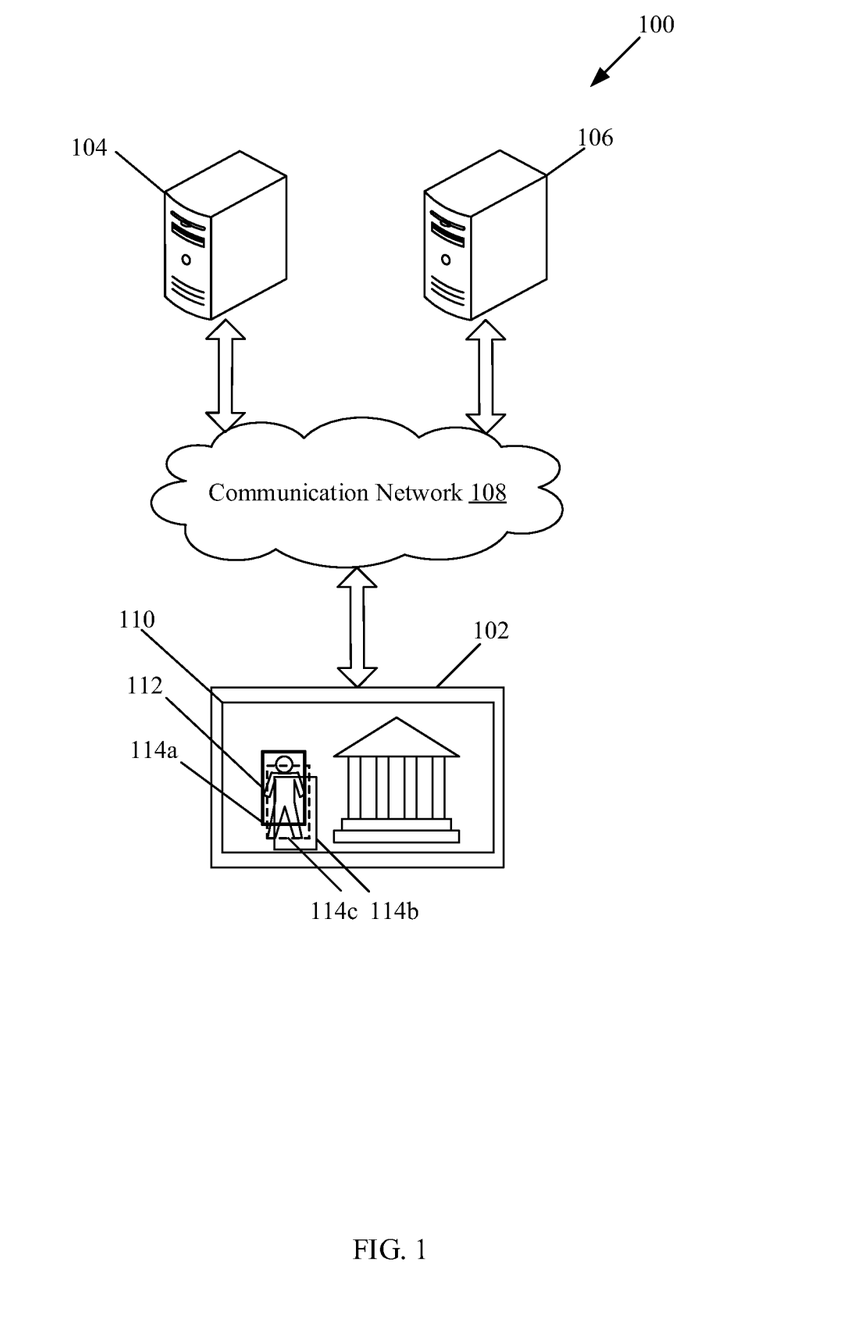
FIG. 1 illustrates an exemplary network environment to track an object, in accordance with an embodiment of the disclosure.

FIG. 1 is an environment diagram that illustrates an exemplary network environment to track an object, in accordance with an embodiment of the disclosure. With reference to FIG. 1, there is shown an exemplary network environment 100. The exemplary network environment 100 may include an electronic device 102, an application server 104, a video content server 106, and a communication network 108. The electronic device 102 may include a display screen 110. The electronic device 102 may be configured to track one or more objects, such as an object 112. The electronic device 102 may be communicatively coupled to the application server 104, and the video content server 106, via the communication network 108.

The electronic device 102 may comprise suitable logic, circuitry, interfaces, and/or code that may be configured to capture a video stream of an environment that surrounds the object 112, which is to be tracked. The electronic device 102 may be configured to process the captured video stream to track and determine the object 112. The electronic device 102 may further highlight a position of the object 112, in the video stream, presented at the display screen 110. The electronic device 102 may be configured to determine the position of the object 112 by use of one or more trackers. The electronic device 102 may be configured to compute a first bounding box 114a by use of a first tracker. Further, the electronic device 102 may be configured to compute a second bounding box 114b by use of a second tracker. The first bounding box 114a and the second bounding box 114b may depict the position of the object 112, determined through respective trackers. Examples of the electronic device 102 may include a surveillance camera, a smartphone, a video camera, a personal camera, or other such electronic devices that comprise one or more image sensors.

The application server 104 may comprise suitable logic, circuitry, interfaces, and/or code that may be configured to host an application to process the video stream. The application server 104 may be configured to host the application for the one or more subscribed devices, such as the electronic device 102. The application server 104 may be implemented by use of several technologies that are known in the art.

The video content server 106 may comprise suitable logic, circuitry, interfaces, and/or code that may be configured to host the video stream. The video content server 106 may be communicatively coupled with a remote video-capturing device (not shown) configured to record and store the video stream at the video content server 106. The video content server 106 may be further configured to transmit a live video stream to the electronic device 102, via the communication network 108. The video content server 106 may be implemented by use of several technologies that are known in the art.

The communication network 108 may include a medium through which the electronic device 102 may communicate with one or more servers, such as the application server 104, and/or the video content server 106. Examples of the communication network 108 may include, but are not limited to, the Internet, a cloud network, a Wireless Fidelity (Wi-Fi) network, a Wireless Local Area Network (WLAN), a Local Area Network (LAN), a telephone line (POTS), Long Term Evolution (LTE), and/or a Metropolitan Area Network (MAN). Various devices in the exemplary network environment 100 may be configured to connect to the communication network 108, in accordance with various wired and wireless communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), Zigbee, EDGE, infrared (IR), IEEE 802.11, 802.16, cellular communication protocols, and/or Bluetooth (BT) communication protocols.

The display screen 110 may comprise suitable logic, circuitry, interfaces, and/or code that may be configured to present the video stream, captured by the electronic device 102 or received from one or more video content source, such as the video content server 106. The display screen 110 may further be configured to present one or more features that correspond to applications downloaded from the application server 104. The display screen 110 may be realized through several known technologies that may include, but are not limited to, a Liquid Crystal Display (LCD) display, a Light Emitting Diode (LED) display, an Organic LED (OLED) display technology, and/or the like.

The object 112 may be defined as an entity, in the captured video stream, which may be of interest for further analysis. The object 112 may correspond to a shape and appearance. The shape of the object 112 may be represented by a point (such as a centroid), a set of points, a primitive geometric shape (such as a rectangle or an ellipse), an object silhouette, an object contour, an articulated shape model, a skeletal model, and/or the like. The appearance of the object 112 may be represented by a probability density of an appearance of the object 112, a template, and active appearance model, a multi-view appearance model, and/or the like. Examples of the object may include, but are not limited to, a person in a park, a boat in a river, a fish inside an aquarium, a vehicle on a road, or an airplane in the air.

A first bounding box 114a and a second bounding box 114b may correspond to a primitive geometric shape, such as a rectangle, that may encompass a target object, such as the object 112. The first bounding box 114a and the second bounding box 114b may be computed by a first tracker and a second tracker in the electronic device 102, respectively. The first tracker and the second tracker may compute the first bounding box 114a and the second bounding box 114b, by use of a first tracker algorithm and a second tracker algorithm, respectively. The first tracker algorithm and the second tracker algorithm may be based on one or more image processing and/or computer vision algorithms known in the art.

In operation, the electronic device 102 may be configured to capture a video stream that may comprise a target object, such as the object 112, which is to be tracked. The object 112 may be tracked based on one or more attributes. The one or more attributes may comprise color information of the object 112 and/or depth information of the object 112 in an image frame of the video stream. In accordance with an embodiment, the electronic device 102 may be configured to retrieve the video stream, which is to be processed, from the video content server 106, via the communication network 108. In accordance with an embodiment, the video stream may be recorded by a remote video-capturing device and may be streamed to the electronic device 102 in real time. In such a case, the recorded video stream may be pre-stored at a local memory present in the video content server 106.

The electronic device 102 may be configured to process the video stream by use of a pre-specified application. In accordance with an embodiment, the pre-specified application may be retrieved from the memory of the electronic device 102. In accordance with an embodiment, the electronic device 102 may download the pre-specified application from the application server 104, via the communication network 108.

In accordance with an embodiment, the electronic device 102 may be configured to process the video stream to track the object 112. The electronic device 102 may be configured to compute a first bounding box 114a by use of a first tracker. The first bounding box 114a may be computed by the first tracker by use of a first tracker algorithm. The electronic device 102 may be further configured to compute a second bounding box 114b by use of a second tracker. The second bounding 114b box may be computed by the second tracker by use of a second tracker algorithm. In accordance with an embodiment, the first tracker algorithm and/or the second tracker algorithm may be retrieved from the local memory of the electronic device 102. In accordance with an embodiment, the first tracker algorithm and/or the second tracker algorithm may be retrieved from the application server 104, via the communication network 108. The electronic device 102 may be configured to track the object 112 in the video stream, based on the first bounding box 114a and the second bounding box 114b. The first bounding box 114a and the second bounding box 114b may depict positions of the object 112 in the video stream.

In accordance with an embodiment, the first bounding box 114a may partially encompass a first portion of the object 112. The second bounding box 114b may partially encompass a second portion of the object 112. In accordance with an embodiment, the first portion of the object 112 encompassed by the first bounding box 114a and the second portion of the object 112 encompassed by the second bounding box 114b, may be the same or different.

In accordance with an embodiment, the electronic device 102 may be configured to compute an overlap value between the first bounding box 114a and the second bounding box 114b, associated with the object 112, in the image frame of the video stream. The first bounding box 114a may be associated with a first set of parameters and the second bounding box 114b may be associated with a second set of parameters. The first set of parameters and the second set of parameters may comprise location information, size information, and/or orientation information of associated bounding boxes. In accordance with an embodiment, the electronic device 102 may be configured to determine average values of the first set of parameters and the second set of parameters. In accordance with an embodiment, the average values may be determined when the computed overlap value between the first bounding box 114a and the second bounding box 114b exceeds a pre-defined threshold value.

In accordance with an embodiment, the electronic device 102 may be configured to determine a third bounding box 114c, based on the determined average values. The third bounding box 114c may encompass a third portion of the object 112, in the image frame of the video stream. The third bounding box 114c may depict the position of the object 112 in the video stream, based on the combination of first tracker and second tracker. In accordance with an embodiment, the electronic device 102 may be configured to maintain and update an object model or a template of the object 112. The electronic device 102 may further be configured to extract the third portion of the object 112, from the image frame of the video stream that corresponds to the third bounding box 114c. In accordance with an embodiment, the electronic device 102 may be configured to update the object model of the object 112 based on the extracted third portion of the object 112. In accordance with an embodiment, the electronic device 102 may be configured to update the object model or template of the object 112 based on a count of instances when the computed overlap value is higher than the pre-defined threshold value, and exceeds a pre-defined number.

In accordance with an embodiment, when the computed overlap value between the first bounding box 114a and the second bounding box 114b is lower than the pre-defined threshold value, the electronic device 102 may be configured to compute a first score and a second score. The computed first score may be associated with the first bounding box 114a. The computed second score may be associated with the second bounding box 114b.

In accordance with an embodiment, the first score associated with the first bounding box 114a may be computed, based on a first motion consistency value. The first motion consistency value may be determined, based on the consistency of motion between the first bounding box 114a and one or more of previous instances of the first bounding box 114a in one or more previous image frames of the video stream. In accordance with an embodiment, the first score associated with the first bounding box 114a may be computed, based on a first visual similarity value. The first visual similarity value may be determined, based on the similarity between object 112 and one or more previous instances of the first bounding box 114a, in one or more previous image frames of the video stream. In accordance with an embodiment, the first score may be computed based on a combination of the first motion consistency value and the first visual similarity value.

Similarly, the second score associated with the second bounding box may be computed based on a second motion consistency value. The second motion consistency value may be computed based on consistency of motion between the second bounding box 114b and one or more of previous instances of the second bounding box 114b, in one or more previous image frames of the video stream. In accordance with an embodiment, the second score associated with the second bounding box 114b may be computed based on a second visual similarity value. The second visual similarity value may be computed based on visual similarity between the object 112 and one or more previous instances of the second bounding box in one or more previous image frames of the video stream. In accordance with an embodiment, the second score may be computed, based on a combination of the second motion consistency value and the second visual similarity value.

In accordance with an embodiment, the electronic device 102 may be configured to update the first bounding box 114a to a new bounding box that may at least partially encompass the object 112. The new bounding box may be updated based on the first score and/or the second score. The first bounding box 114a may be updated when the first score is lower than the second score. In accordance with an embodiment, the new bounding box may be computed based on the second bounding box 114b when the first score is lower than the second score.

In accordance with an embodiment, the electronic device 102 may be configured to output the second bounding box 114b from the image frame of the video stream as the final output. The electronic device 102 may output the second bounding box 114b when the computed overlap value is lower than the pre-defined threshold value and when the first score is lower than the second score.

Figure 2:
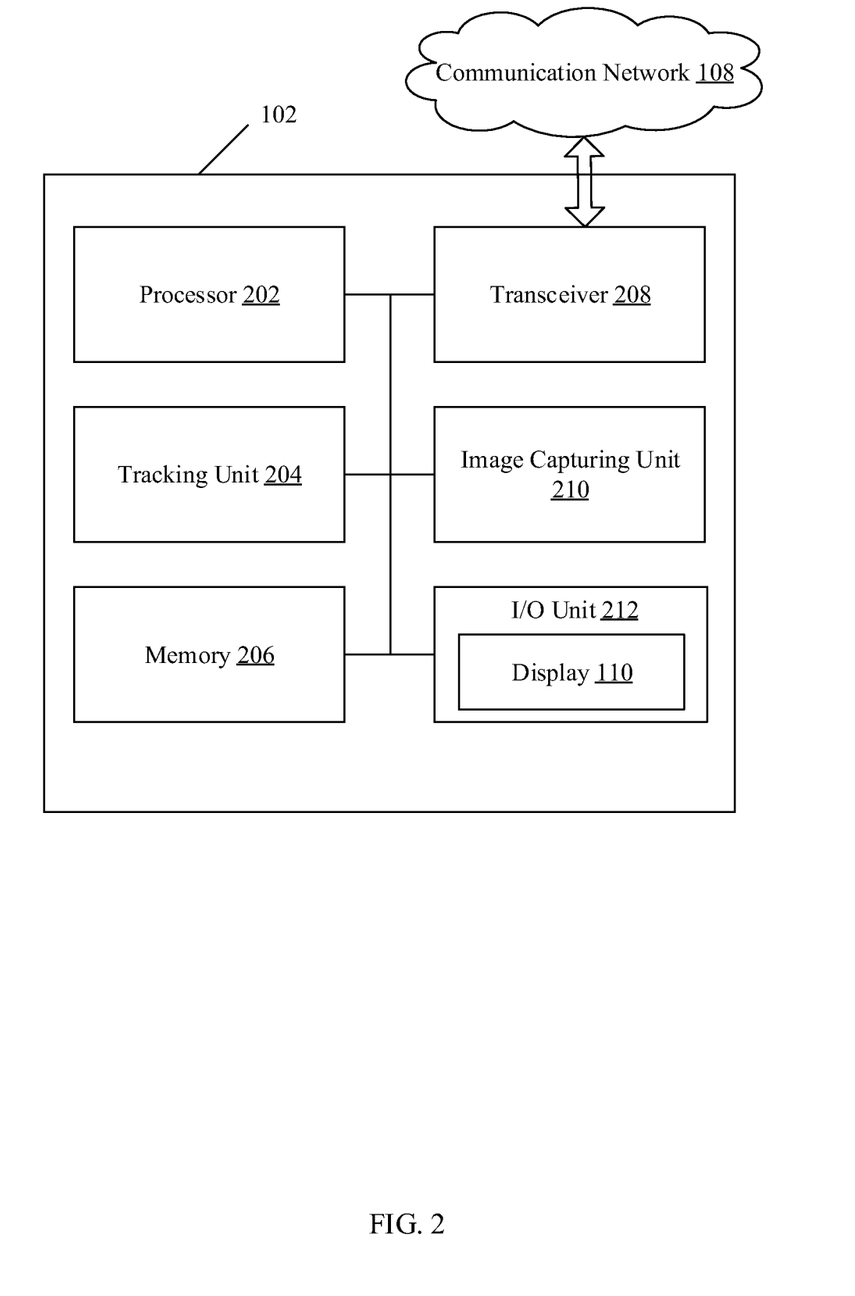
FIG. 2 is a block diagram that illustrates an exemplary electronic device to track an object, in accordance with an embodiment of the disclosure.

FIG. 2 is a block diagram that illustrates an exemplary electronic device to track an object, in accordance with an embodiment of the disclosure. FIG. 2 is explained in conjunction with elements from FIG. 1. With reference to FIG. 2, there is shown the electronic device 102. The electronic device 102 may comprise one or more processors, such as a processor 202, a tracking unit 204, a memory 206, one or more transceivers, such as a transceiver 208, an image-capturing unit 210 and one or more input/output (I/O) devices, such as an I/O unit 212. The I/O unit 212 may comprise the display screen 110. The tracking unit 204 may further include a first tracker 204a and a second tracker 204b.

The processor 202 may be communicatively coupled to the tracking unit 204, the memory 206, the transceiver 208, the image-capturing unit 210 and the I/O unit 212. In accordance with an embodiment, the electronic device 102 may be communicatively coupled to the one or more servers, such as the application server 104, the video content server 106, and/or other electronic devices (not shown), through the communication network 108 (FIG. 1), via the transceiver 208. Alternatively, the electronic device 102 may not include the transceiver 208. In such a case, the electronic device 102 may not be enabled to communicate with other servers and/or other electronic devices.

The processor 202 may comprise suitable logic, circuitry, interfaces, and/or code that may be configured to execute a set of instructions stored in the memory 206. The processor 202 may be configured to process the output of image-capturing unit 210. The processor 202 may be configured to track the object 112 in one or more image frames of the captured video stream. The processor 202 may be configured to track the object 112 by execution of one or more tracker algorithms, stored in the memory 206 of the electronic device. Examples of the processor 202 may be an X86-based processor, a Reduced Instruction Set Computing (RISC) processor, an Application-Specific Integrated Circuit (ASIC) processor, a Complex Instruction Set Computing (CISC) processor, and/or other processors.

The tracking unit 204 may comprise suitable logic, circuitry, interfaces, and/or code that may be configured to track a target object, such as the object 112. The object 112 may be represented by use of one of the various shape and/or appearance models. The tracking unit 204 may utilize a pre-determined tracking model, such as an appearance representation tracking model, to track the object 112. Accordingly, the tracking unit 204 may use templates, represented by a primitive object region (such as a rectangular region), that encompasses the region occupied by the object 112 in the image frame. The tracking unit 204 may track the object 112, based on computation of affine parametric transformation motions, such as translation and rotation of the template in consecutive image frames. The tracking unit 204 may be implemented as one or more processors, based processor technologies known in the art.

The tracking unit 204 may comprise the first tracker 204a and the second tracker 204b, collectively referred to as object trackers. The first tracker 204a may retrieve a first tracker algorithm from the memory 206. The first tracker 204a may execute the first tracker algorithm and generate the first bounding box 114a. Similarly, the second tracker 204b may retrieve a second tracker algorithm from the memory 206. The second tracker 204b may execute the second tracker algorithm and generate the second bounding box 114b. In accordance with an embodiment, the first tracker 204a and the second tracker 204b may track the object 112 independently of each other. In accordance with an embodiment, the first tracker 204a and the second tracker 204b may track the object 112 in conjunction with each other.

A person with ordinary skill in the art will understand that the disclosure may not be so limited, and the first tracker 204a and the second tracker 204b may also be implemented by the processor 202, without limitation of the scope of the disclosure. In such a case, one or more components of the processor 202 may execute the first tracker algorithm, to be functionally similar to the first tracker 204a. Further, one or more other components of the processor 202 may execute the second tracker algorithm, to be functionally similar to the second tracker 204b. Notwithstanding, the disclosure may not be so limited, and one or more additional trackers, other than the first tracker 204a and the second tracker 204b may be used to track the object 112, without departure from the scope of the disclosure.

The memory 206 may comprise suitable logic, circuitry, and/or interfaces that may be configured to store a machine code and/or a computer program with at least one code section executable by the processor 202. In accordance with an embodiment, the memory 206 may be further configured to store one or more images or video streams, captured by the electronic device 102. Further, the memory 206 may be configured to store one or more parameters, such as the pre-defined threshold value, the first tracker algorithm, the second tracker algorithm, the pre-defined number of count instances to update the model of the object 112, and template image of the object 112. Examples of implementation of the memory 206 may include, but are not limited to, Random Access Memory (RAM), Read Only Memory (ROM), Hard Disk Drive (HDD), and/or a Secure Digital (SD) card.

The transceiver 208 may comprise suitable logic, circuitry, interfaces, and/or code that may be configured to communicate with another electronic device or one or more servers, such as application server 104 and video content server 106, via a communication network 108. The transceiver 208 may implement known technologies to support wired or wireless communication. The transceiver 208 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer.

The transceiver 208 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as Global System for Mobile Communications (GSM), Enhanced Data GSM Environment (EDGE), wideband code division multiple access (W-CDMA), code division multiple access (CDMA), Long Term Evolution (LTE), time division multiple access (TDMA), Bluetooth, Wireless Fidelity (Wi-Fi) (such as IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

The image-capturing unit 210 comprises suitable logic, circuitry, and/or interfaces that may be configured to capture an environment that surrounds the object 112. Specifically, the image-capturing unit 210 may be equipped with a photographic optical system, such as a photographic lens and/or a zoom lens, as well as one or more image sensors, such as a charge-coupled device (CCD) or a complementary metal-oxide-semiconductor (CMOS). The photographic optical system may condense light emitted from the object 112, and form an object image on an imaging surface of the one or more image sensors. The one or more image sensors may convert the object image formed by the photographic optical system into an electrical image signal. Examples of implementation of the image-capturing unit 210 may include, but are not limited to, a digital camera, a camera embedded in a personal digital assistant (PDA), a video camera, and/or a motion camera.

The I/O unit 212 may comprise suitable logic, circuitry, interfaces, and/or code that may be configured to receive an input from a computational unit, such as a pedestrian detector and/or the like. The I/O unit 212 may be further configured to provide an output to another computational unit, such as a camera servomotor that may be configured to track the object 112. The I/O unit 212 may comprise various input and output devices that may be configured to communicate with the processor 202. In an instance, the I/O unit 212 may be configured to receive an input from the user, or provide an output to the user. The input may correspond to a template image of the object 112, to be tracked in the video frame, via input devices. Further, the input may correspond to selection of one or more objects from a plurality of objects, present in the video frame that may be tracked, via the input devices. The tracked object 112 may be highlighted and presented on the display screen 110, via the output devices. The I/O unit may comprise a display screen 110. Examples of the I/O unit 212 may include, but are not limited to, a keyboard, a mouse, a joystick, a touch screen, a touch pad, a microphone, a camera, a motion sensor, a light sensor, and/or a docking station.

In operation, the image-capturing unit 210 may capture a video stream of the object 112, which is to be tracked. The tracking unit 204 may be configured to track the object 112 in each image frames of the video stream. The tracking unit 204 may track the object 112 by use of the first tracker 204a and the second tracker 204b.

The tracking unit 204 may be configured to execute the first tracker algorithm and/or the second tracker algorithm. The tracking unit 204 may be configured to learn the appearance of the object 112, based on the first tracker 204a and the second tracker 204b, which correspond to the execution of the first tracker algorithm and the second tracker algorithm, respectively. The appearance may be learned before the object 112 is tracked in the image frame.

In accordance with an embodiment, to represent the appearance or feature of the object 112 to be learned, the processor 202 may be configured to use one or more of the representations that may comprise a histogram, template, Local binary pattern (LBP), Histogram of Oriented Gradients (HOG), and/or HAAR feature representations. The processor 202 may be configured to use one or more search strategies to search for the object 112 in an image frame. The one or more search strategies may comprise Mean-shift searching, Normalized Cross-correlation searching, sliding window classifier score maximization searching, and/or the like. Further, the processor 202 may be configured to use one or more motion models to represent the motion model of the object 112. The motion models may comprise Brownian motion model, constant velocity model, constant acceleration model, and/or the like. The one or more tracker algorithms may use any combination of above mentioned algorithms from each of the feature representation, search strategy, and/or motion model. The first tracker algorithm and the second tracker algorithm may differ from each other in one or more of the feature representation, the search strategy, and the motion model.

In accordance with an embodiment, the first tracker 204a and the second tracker 204b may be provided with a template image of object 112. The first tracker 204a and the second tracker 204b may be configured to learn the appearance of the object 112 based on the provided template of the object 112. The first tracker 204a and the second tracker 204b may be configured to search for the object 112 in the image frame and consecutive frames of the video stream, based on the learned appearance of the object 112. The first tracker 204a and the second tracker 204b may be configured to learn the appearance of the object 112, based on one or more attributes of the object 112. The attributes of the object 112 may include an image patch of the object 112, color information, orientation information, scaling information and/or the like.

In accordance with an embodiment, the first tracker 204a and the second tracker 204b may be configured to compute the first bounding box 114a and the second bounding box 114b. The first bounding box 114a and the second bounding box 114b may indicate a location and position of the object 112 in the image frame of the video stream, based on the learned attributes of the object 112. The first bounding box 114a may be associated with a first set of parameters and the second bounding box 114b may be associated with a second set of parameters. The first set of parameters and the second set of parameters may comprise location information, size information, and/or orientation information of the respective bounding boxes.

Generically, an output of a tracker, "n", at an image frame, "t", may be represented as a rectangular region, "$z_t^n$", in accordance with equation (1).

$$z_t^n = \{x_t, y_t, w_t, h_t\} \quad (1)$$

where, "$x_t$" and "$y_t$" are the coordinates values of the location of the object 112 encompassed in the bounding box in the image frame;

and "$w_t$" and "$h_t$" are the respective width and height of the object 112 in the associated bounding boxes that correspond to the size information of the object 112. In accordance with an embodiment, an image patch from the image frame, "t", in the rectangular region, "$z_t^n$", may be represented as, "$I_t(z_t^n)$".

In accordance with an embodiment, the tracking unit 204 may combine the individual output results of first tracker 204a and the second tracker 204b to track the object 112. The tracking unit 204, in conjunction with the processor 202, may be configured to perform drift-detection and drift-correction operations. The tracking unit 204, in conjunction with the processor 202, may be configured to perform the drift detection to determine which one of the first bounding box 114a and the second bounding box 114b has drifted from the object 112. The tracking unit 204, in conjunction with the processor 202, may be further configured to compute an overlap value between the first bounding box 114a and the second bounding box 114b, to detect the drift. The criterion for the drift detection may be based on a mutual overlap value of the first bounding box 114a of the first tracker 204a and the second bounding box 114b of the second tracker 204b. In accordance with an embodiment, the overlap value may be computed in accordance with equation (2).

$$\text{Overlap value (tracker1, tracker2)} = \Delta(z_t^1, z_t^2) = \frac{z_t^1 \cap z_t^2}{z_t^1 \cup z_t^2} \quad (2)$$

where, "$z_t^1$" represents the bounding box 114a of the first tracker 204a at time "t", and "$z_t^2$" represents the bounding box 114b of the second tracker 204b at time "t".

In accordance with an embodiment, the drift may be detected when the overlap value is less than a pre-defined threshold value, "T". In accordance with an embodiment, the pre-defined threshold value, "T", may be retrieved from the memory 206. In accordance with an embodiment, the pre-defined threshold value, "T", may correspond to an experimentally derived value and depends on given application. In accordance with an embodiment, the pre-defined threshold value, "T", may be provided by a user associated with the electronic device 102.

In accordance with an embodiment, the overlap value greater than the pre-defined threshold value, "T", may indicate that no drift is detected. In such a case, a high degree of overlap will occur between the first bounding box 114a and the second bounding box 114b. In accordance with an embodiment, the tracking unit 204, in conjunction with the processor 202, may be configured to determine average values of the first set of parameters and the second set of parameters to compute a third bounding box 114c, "$z_t^f$". The third bounding box 114c, "$z_t^f$", may be computed in accordance with equation (3):

$$z_t^f = \frac{z_t^1 + z_t^2}{2} \quad (3)$$

In accordance with an embodiment, the processor 202 may be configured to maintain an object model for the object 112, based on one or more attributes, such as an image patch of the object 112, color information, orientation information, and/or scaling information. The object model of the object 112 may comprise a template image of the object 112 that may be extracted from one of the previous image frames. The processor 202 may be configured to update the object model periodically to determine a best current model, "$P^*$". Therefore, the template of the object 112 may represent a current appearance of the object 112. The processor 202 may update the object model "$P^*$" with the image patch, "$I^t(z_t^f)$", which corresponds to the third bounding box 114c from the current image frame, as represented in equation (4):

$$P^* = I^t(z_t^f) = (I^t)\left(\frac{z_t^1 + z_t^2}{2}\right) \quad (4)$$

The processor 202 may be configured to update the object model, in accordance with equation (4), when no drift is detected in the tracking of object 112 for a pre-determined number of consecutive image frames, such as "5 frames", in accordance with a condition, as represented in equation (5):

$$\Delta(z_t^1, z_t^2) > T, \Delta(z_{t-1}^1, z_{t-1}^2) > T, \ldots, \Delta(z_{t-k}^1, z_{t-k}^2) > T \quad (5)$$

where, the equation (5) represents that the object model may be updated only when the overlap value between the first bounding box 114a and second bounding box 114b is greater than pre-defined threshold value, "T", for a pre-determined number of previous consecutive frames, "k". The pre-determined number "k" may be chosen experimentally and may be stored in the memory 206. In accordance with an embodiment, the pre-determined number "k" may be provided by the user at the time of when the object is tracked.

In accordance with an embodiment, the overlap value may be less than the pre-defined threshold value, "T". The tracking unit 204, in conjunction with the processor 202, may be configured to calculate a first score for the first bounding box 114a, and a second score for the second bounding box 114b. Based on the first score and the second score, the tracking unit 204, in conjunction with the processor 202, may be configured to select the correct tracker. The correct tracker may be selected from one of the first tracker 204a and the second tracker 204b. For example, the first tracker 204a may be selected as the correct tracker. The selected correct tracker, such as the first tracker 204a, may correspond to a tracker that may not have drifted away from the object 112. Further, the tracking unit 204, in conjunction with the processor 202, may be configured to re-initialize the other tracker, such as the second tracker 204b, that may have drifted away from the object 112.

In accordance with an embodiment, the tracking unit 204, in conjunction with the processor 202, may be configured to calculate the first score and the second score based on visual similarity. The calculated first and the second scores may be based on a visual similarity between the current bounding boxes of the associated trackers and the last estimated object model of the object 112. In accordance with an embodiment, the calculated first and the second scores may have a higher value if the pixels represented by the bounding boxes in an image frame of the object 112 are visually similar to the object model of the object 112. In accordance with an embodiment, the visual similarity may be calculated based on the Bhattacharyya Distance. In accordance with an embodiment, the tracking unit 204, in conjunction with the processor 202, may be configured to calculate the visual similarity score, "$S(I_t(z_t^1), P^*)$", representing visual similarity of the first bounding box 114a or the second bounding box 114b, at time t, with the object model of the object 112, in accordance with equation (6):

$$S(I_t(z_t^1), P^*) = \Sigma_{i=1}^N p(i)q(i) \qquad (6)$$

where, "p" represents the histogram of the object model of the object 112; and "q" represents the histogram of the image region as indicated by the first bounding box 114a or the second bounding box 114b at time "t".

The histograms may be based on a hue, saturation, value (HSV) color space that may be calculated from hue and saturation channels of the image frame. For example, "50 bins" may correspond to the hue space and "60 bins" may correspond to the saturation space.

In accordance with an embodiment, the tracking unit 204, in conjunction with the processor 202, may be configured to calculate the first score and the second score, based on a motion consistency value. The processor 202 may be configured to maintain an object model of the movement of object 112, based on position of the object 112 in previous frames of the video stream. In accordance with an embodiment, positional value of the bounding box of the current frame may be hypothesized based on positional value of the bounding box for the one or more previous frames. The tracking unit 204, in conjunction with the processor 202, may be configured to calculate a tracker velocity in accordance with equation (7):

$$D_t = z_t^n - z_{t-1}^n \qquad (7)$$

where, "$D_t$" represents the tracker velocity at frame, "t" for the tracker "n";
"$z_t^n$" represents bounding box of a tracker "n" at frame "t"; and
"$z_{t-1}^n$" represents the bounding box of a tracker "n" at frame "t−1".

The equation (7) represents a vector defined by centroids of the bounding box at frame "t" and bounding box at frame, "t−1". The estimated bounding box for the frame, "t", may be computed, based on the bounding box for frame, "−1", and the tracker velocity for the frame, "t−1", in accordance with equation (8):

$$z_t^{n'} = z_{t-1}^n + D_{t-1} \qquad (8)$$

where, "$z_t^{n'}$" represents the hypothesized bounding box for tracker "n" at frame "t";
"$z_{t-1}^n$" represents the bounding box of tracker "n" at frame "t−1"; and
"$D_{t-1}$" represents the tracker velocity computed for the frame "t−1".

The motion consistency may be calculated by computation of an overlap value between the current bounding box and the hypothesized bounding box using the tracker velocity. In accordance with an embodiment, the tracking unit 204, in conjunction with the processor 202, may be configured to calculate a motion consistency value, "$K(z_t^n, z_{t-1:t-1-M}^n)$", based on the computation of the overlap value between the current bounding box and the bounding box of tracker "n" for previous "M" consecutive frames. In accordance with an embodiment, the calculated motion consistency value may be stored in the memory 206 of the electronic device 102. The stored motion consistency value may be used to calculate the motion consistency value of subsequent image frames of the video stream.

In accordance with an embodiment, the tracking unit 204, in conjunction with the processor 202, may be configured to calculate the first score for the first tracker 204a, and the second score for the second tracker 204b. The calculation of the first score and the second score may be based on a combination of the visual similarity value and the motion consistency value to calculate a combined score "$\gamma_n$". A combined score "$\gamma_n$" for a tracker "n" may be calculated in accordance with equation (9):

$$\gamma_n = \alpha * K(z_t^n, z_{t-1:t-1-M}^n) + (1-\alpha) * S(I_t(z_t^n), P^*) \qquad (9)$$

where, "$K(z_t^n, z_{t-1:t-1-M}^n)$" corresponds to the motion consistency value for the tracker "n";
"$S(I_t(z_t^n), P^*)$" corresponds to the visual similarity value for the tracker "n"; and
"$\alpha$" represents a mixing parameter that is used to change the respective importance of either the visual similarity value or the motion consistency value. The mixing parameter "$\alpha$", corresponds to the weightage of the motion consistency value and the visual similarity value in the combined score "$\gamma_n$" for a tracker "n". This value may be determined experimentally and may be stored in the memory 206.

In accordance with an embodiment, the tracking unit 204, in conjunction with the processor 202, may be configured to compare the first score associated with first bounding box 114a with the second score associated with the second bounding box 114b. Based on the comparison, the tracking unit 204, in conjunction with the processor 202, may be configured to determine which one of the first tracker 204a and the second tracker 204b has drifted away from the object 112. Further, the tracking unit 204, in conjunction with the processor 202, may be configured to update and/or re-initialize the tracker, which has drifted away from the object 112.

In accordance with an embodiment, the tracking unit 204, in conjunction with the processor 202, may be configured to re-initialize the first tracker 204a when the first score is less than the second score. The tracking unit 204, in conjunction with the processor 202, may be further configured to generate a re-initialization signal to re-initialize the first tracker. The first tracker 204a may be configured to be re-initialized by use of the template of the object 112 from the object model of the object 112. The first tracker 204a may be configured to re-learn the appearance of the object 112 based on the template of the object 112. Further, the first tracker 204a may search for the object 112 in subsequent image frames based on the re-learned appearance of the object 112. Further, the tracking unit 204, in conjunction with the processor 202, may be configured to update the first bounding box 114a to a new bounding box that may at least partially encompass the object 112. Further, the new bounding box may be computed based on the second set of parameters associated with the second bounding box 114b, when the first score is lower than the second score.

Further, the tracking unit 204, in conjunction with the processor 202, may be configured to output the third bounding box 114c, to depict the position of the object 112 in the image frame of the video stream as the final output. The third bounding box 114c may be same as the second bounding box 114b when the first score is less than the second score, and the aforementioned steps to track the object 112 may be repeated for the subsequent frames of the image frames of the video stream, without departure from the scope of the disclosure.

Figure 3:
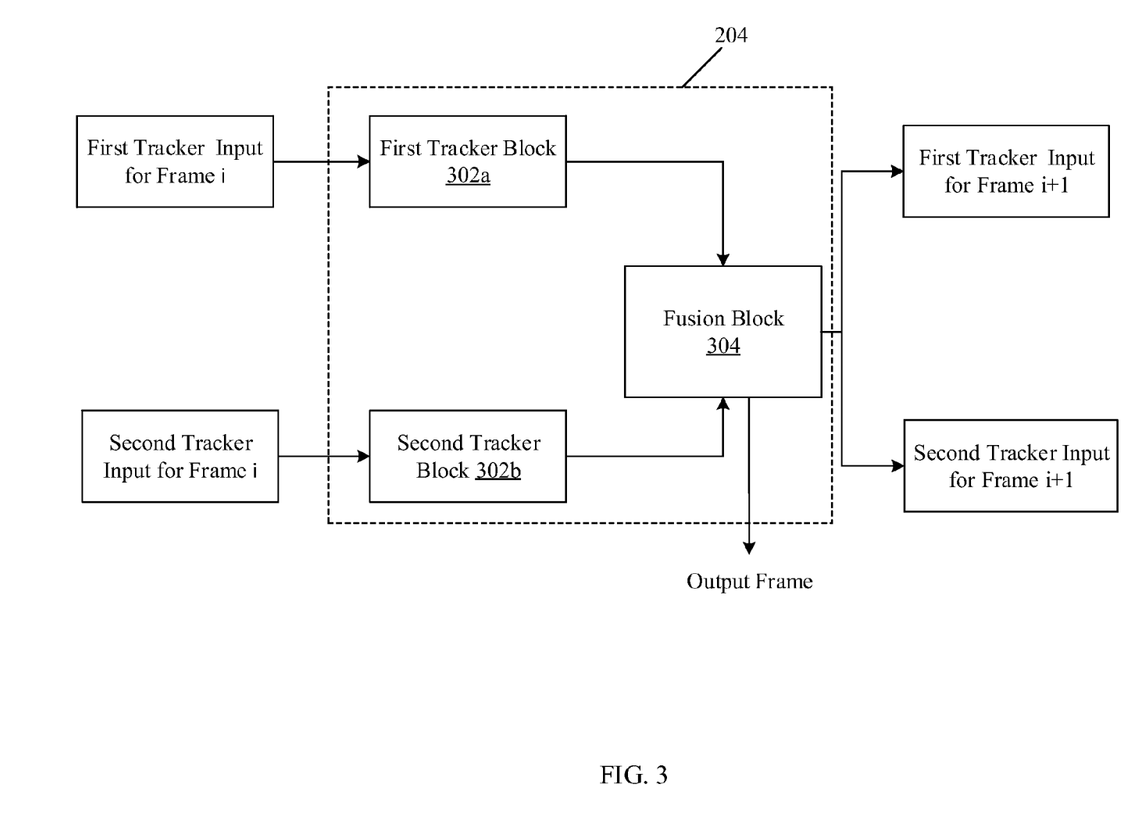
FIG. 3 illustrates an exemplary system diagram to implement the disclosed system and method to track an object, in accordance with an embodiment of the disclosure.

FIG. 3 illustrates an exemplary system diagram for implementing the disclosed system and method to track an object, in accordance with an embodiment of the disclosure. FIG. 3 is explained in conjunction with elements from FIG. 1 and FIG. 2. With reference to FIG. 3, there is shown a system diagram 300 of various processing blocks of the tracking unit 204. The various processing blocks of the tracking unit 204 may include a first tracker block 302a, a second tracker block 302b and a fusion block 304. The FIG. 3 further comprises an input frame 306a and output frame 306b.

With reference to FIG. 3, the first tracker block 302a and the second tracker block 302b may be configured to receive a first tracker input and a second tracker input. The first tracker input and the second tracker input may comprise an input frame 306a, a template image of the object 112 to be tracked, and a re-initialization signal. In accordance with an embodiment, the first tracker input and the second tracker input may further comprise a command to switch an input type that may re-direct the tracker to recover from failure.

The first tracker block 302a and the second tracker block 302b may be configured to receive the input frame 306a from the image-capturing unit 210. The input frame 306a may correspond to an image frame of the video stream captured by the electronic device 102 of an environment that surrounds the object 112. The first tracker block 302a and the second tracker block 302b may be configured to learn the appearance of the object 112 from the template image of the object. The first tracker block 302a and the second tracker block 302b may be further configured to search for the object 112 in the input frame 306a, based on the learned template image of the object. The first tracker block 302a may be configured to output the first bounding box 114a, to depict the position of the object 112 in the input frame 306a. Similarly, the second tracker block 302b may be configured to output the second bounding box 114b, to depict the position of the object 112 in the input frame 306a.

Based on the first bounding box 114a and the second bounding box 114b, the fusion block 304 may be configured to compute the third bounding box 114c. The third bounding box 114c may depict the position of the object 112 in the image frame, based on the combined output of first tracker block 302a and the second tracker block 302b. The fusion block 304 may be further configured to output the output frame 306b with the third bounding box 114c. Further, the input for the first tracker block 302a and the second tracker block 302b may be computed based on the output of the fusion block 304.

Figure 4:
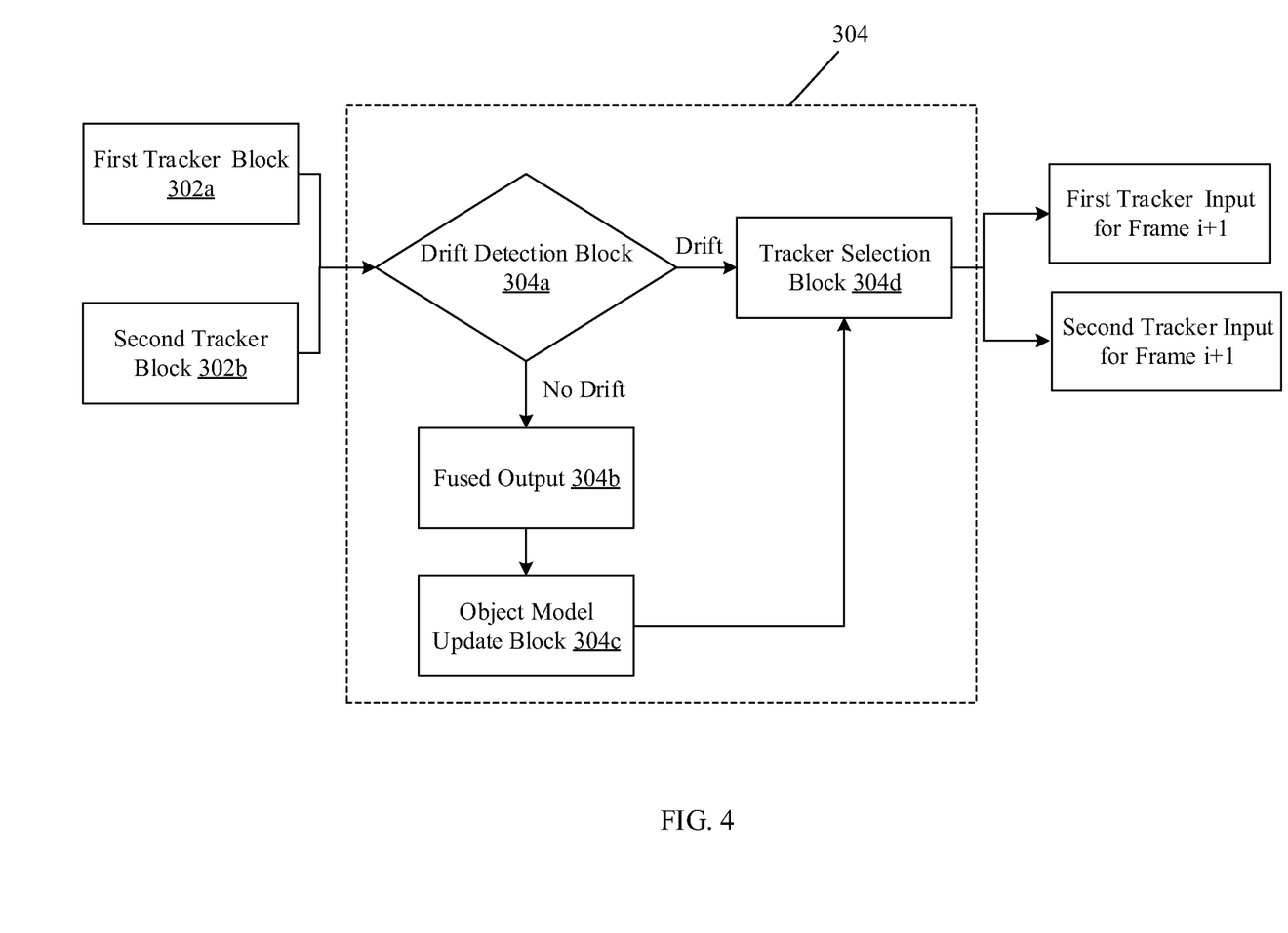
FIG. 4 illustrates an arrangement of various blocks in the fusion block implemented in the disclosed method and system to track an object, in accordance with an embodiment of the present disclosure.

FIG. 4 illustrates an arrangement of various blocks in the fusion block implemented in the disclosed method and system to track an object, in accordance with an embodiment of the present disclosure. FIG. 4 is explained in conjunction with elements from FIG. 1, FIG. 2, and FIG. 3. With reference to FIG. 4, the fusion block may comprise a drift detection block 304a, fused output block 304b, object model update block 304c and tracker selection block 304d.

In accordance with an embodiment, the drift detection block 304a may be configured to receive output from the first tracker block 302a and the second tracker block 302b. The first tracker block 302a may determine the first bounding box 114a and the second tracker block 302b may determine the second bounding box 114b. In accordance with an exemplary scenario, when one of the first tracker or the second tracker drifts away from the object 112 to be tracked, drift detection may be determined by the drift detection block 304a. Drift detection may be based on the output of the first tracker block 302a and the second tracker block 302b. The drift detection block 304a may be further configured to determine the drift, based on computation of an overlap value between the first bounding box 114a and the second bounding box 114b, in accordance with the equation (2). In accordance with a first instance of the exemplary scenario, the computed overlap value may be greater than the pre-defined threshold value. In accordance with another instance of the exemplary scenario, the computed overlap value may be less than the pre-defined threshold value.

In accordance with a first instance of the exemplary scenario, the computed overlap value may be greater than the pre-defined threshold value. The fused output block 304b may be configured to compute the third bounding box 114c, which corresponds to an average value of the first bounding box 114a and the second bounding box 114b, in accordance with the equation (3). Further, the fused output block 304b may be configured to generate an output frame 306b, with the third bounding box 114c, to represent the position of the object 112 in the output frame 306b.

The object model update block 304c may be configured to maintain an object model or a template of the object 112 to be learned. Further, the object model update block 304c may be configured to update the object model of the object 112 when the condition specified in the equation (5) is satisfied. Based on the output of the fused output block 304b, the object model update block 304c may be configured to update the object model of the object 112 to be tracked. The object model update block 304c may be further configured to determine the count of instances for which the computed overlap value is greater than pre-defined threshold for the previous consecutive frames. The object model update block 304c may be further configured to update the object model of the object 112, when the count instances are greater than a pre-determined number. The object model update block 304c may be further configured to extract a portion of the image frame that corresponds to the third bounding box 114c, from the output frame 306b. The extracted portion may be utilized to re-initialize one of first tracker block 302a or the second tracker block 302b in case of drift is determined.

Based on the output of the fused output block 304b, the tracker selection block 304d may be configured to select the third bounding box 114c as the final output. The third bounding box 114c may represent the position of the object 112 in the input frame 306a, based on the combination of output of first tracker block 302a and the second tracker block 302b. Further, a next frame may be provided as the input to the first tracker block 302a and second tracker block 302b.

In accordance with a second instance of the exemplary scenario, the computed overlap value may be less than the pre-defined threshold value. Based on the output of the drift detection block 304a, the tracker selection block 304d may determine which bounding box (of first tracker block 302a or the second tracker block 302b) drifted from the object 112. The tracker selection block 304d may determine the tracker that drifted based on computation of the first score and the second score. The tracker selection block 304d may be configured to compute the first score that corresponds to the first tracker block 302a, in accordance with the equation (9). Similarly, the tracker selection block 304d may be configured to compute the second score that corresponds to the second tracker block, in accordance with the equation (9). The tracker selection block 304d may compare the first score and the second score to determine which tracker block has drifted from the object 112.

In accordance with an embodiment, the tracker block with higher score may be determined as the correct tracker. In such a case, the tracker selection block 304d may be configured to select the bounding box of the correct tracker as the third bounding box 114c. Further, the tracker selection block 304d may be configured to compute input of the first tracker and the second tracker for the next frame. The input may comprise a next frame and a re-initialization signal and template of the object 112 from the object model update block 304c. The re-initialization signal may be used to initialize the drifted tracker with the template image of the object 112 from the object model update block 304c. Based on the receipt of the re-initialization signal, the drifted tracker may be reset to re-learn the appearance of the object 112. The drifted tracker may learn the appearance of the object 112, based on the template of the object 112 received from the object model update block 304c.

Figure 5A:
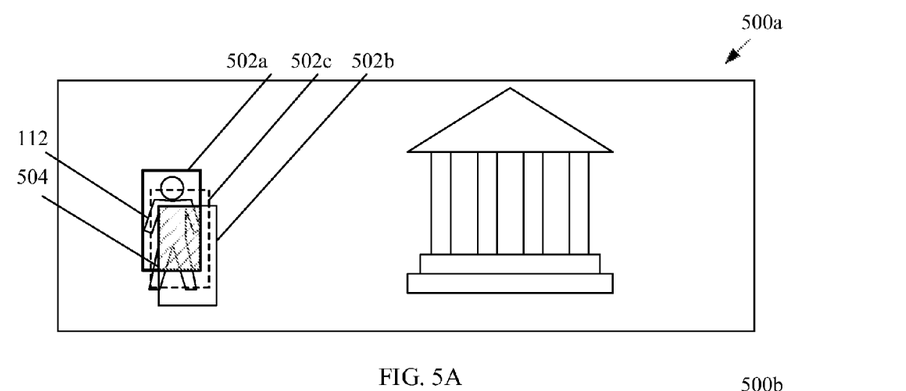
FIGS. 5A, 5B, and 5C illustrate various instances of an exemplary scenario for the disclosed method and system to track an object, in accordance with an embodiment of the disclosure.
Figure 5B:
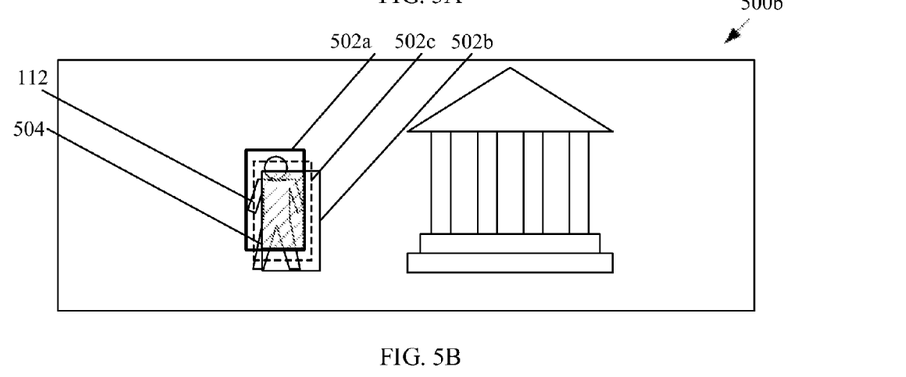
Figure 5C:
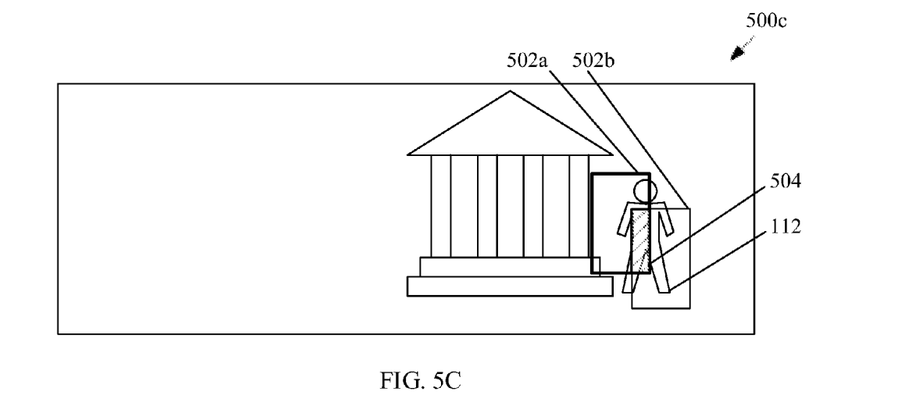

FIGS. 5A, 5B, and 5C illustrate various instances of an exemplary scenario for the disclosed method and system to track an object, in accordance with an embodiment of the disclosure. FIGS. 5A, 5B, and 5C have been described in conjunction with elements from FIG. 2. With reference to FIGS. 5A, 5B, and 5C, there are shown exemplary frames 500a, 500b and 500c, associated with video content. The exemplary frames 500a, 500b and 500c, may comprise an object 112, in motion in a surrounding environment, a first bounding box 502a, a second bounding box 502b, a third bounding box 502c, and an overlap portion 504.

With reference to FIG. 5A, the exemplary frame 500a may comprise the object 112. The object 112 is a non-stationary object that moves past a building. The first tracker 204a and the second tracker 204b may be initialized with a template image of the object 112, from the object model update block 304c. The first tracker 204a and the second tracker 204b may learn the appearance of the object 112, based on the attributes of the object 112. The first tracker 204a and the second tracker 204b may search for the object 112 in the subsequent frames, 500b, 500c, and 500d.

The first tracker 204a may output a first bounding box 502a, based on a first tracker algorithm. The first bounding box 502a may depict the position of the object 112 in the exemplary frame 500a. The second tracker 204b may output a second bounding box 502b, based on a second tracker algorithm. The second bounding box 502b may depict the position of the object 112 in the exemplary frame 500a. The processor 202 may then use the first bounding box 502a and the second bounding box 502b, to predict the position of the object 112. The processor 202 may compute an overlap value between the first bounding box 502a and the second bounding box 502b. The overlap value may correspond to the overlap portion 504, in accordance with the equation (2). The processor 202 computes a third bounding box 502c, based on the computed overlap value. The third bounding box 502c may depict the position of the object 112.

In accordance with a first instance of the scenario, the computed overlap value may be greater than pre-defined threshold value, as described in FIG. 5B. In accordance with a second instance of the scenario, the computed overlap value may be less than the pre-defined threshold value, as described in FIG. 5C.

With reference to FIG. 5B, the object 112 may be shown to move toward its right with respect to the position of the object shown in exemplary frame 500a. Further, it may be considered that the exemplary frame 500b represents a frame after pre-defined frame intervals, such as "3 frames", of the exemplary frame 500a.

In accordance with the first instance of the scenario, the overlap value computed for the first frame, represented by exemplary frame 500a, to the fifth frame, represented by exemplary frame 500b, may be greater than the pre-defined threshold value. The first tracker 204a and the second tracker 204b may search for the object 112 in the exemplary frame 500b. The first tracker 204a may output the first bounding box 502a, to depict the position of the object 112 in the exemplary frame 500b. The second tracker 204b may output the second bounding box 502b to depict the position of the object 112 in the exemplary frame 500b.

The tracking unit 204 may compute an overlap value between the first bounding box 502a, and the second bounding box 502b, which corresponds to the overlap portion 504, in accordance with the equation (2). The tracking unit 204, in conjunction with the processor 202, may be configured to compute an average value of the first bounding box 502a and second bounding box 502b, when the computed overlap value is greater than the pre-defined threshold value. In such a case, the processor 202 may be configured to compute an average value of first set of parameters associated with the first bounding box 502a, and second set of parameters associated with the second bounding box 502b, to compute the third bounding box 502c. The third bounding box 502c may represent the position of the object 112 in the exemplary frame 500b, based on the combination of the output of first tracker 204a and the second tracker 204b.

The tracking unit 204, in conjunction with the processor 202, may be configured to determine a count of instances when the computed overlap value is greater than pre-defined threshold value. The processor 202 may be further configured to decide whether the determined count has exceeded a pre-defined number, such as "3". If the count of instances exceeds the pre-defined number, then an object model of the object 112 may be updated. In accordance with the first instance, since the overlap value is greater than the threshold value for three consecutive frames, the processor 202 may be configured to update the object model of the object 112. The processor 202 may update the object model, based on the third bounding box 502c. Further, the processor 202 may be configured to extract an image portion of the image that corresponds to the third bounding box 502c. The extracted image portion may be used to re-initialize one of the drifted first tracker or the drifted second tracker.

With reference to FIG. 5C, the object 112 may move further toward its right, as shown in the exemplary frame 500c. The first tracker 204a and the second tracker 204b may search for the object 112 in the exemplary frame 500c. The first tracker 204a may output the first bounding box 502a, to depict the position of the object 112 in the exemplary frame 500c. The second tracker 204b may output the second bounding box 502b, to depict the position of the object 112 in the exemplary frame 500c. The tracking unit 204, in conjunction with the processor 202, may be configured to compute an overlap value between the first bounding box 502a and the second bounding box 502b, which corresponds to the overlap portion 504, in accordance with the equation (2). The tracking unit 204 in conjunction with the processor 202, may be configured to determine that a drift has occurred when the computed overlap value is less than the pre-defined threshold value. In such a case, as is the case for exemplary frame 500c, the tracking unit 204, in conjunction with the processor 202, may be configured to compute a first score associated with the first tracker 204a, and a second score associated with the second tracker 204b, in accordance with the equation (9).

The tracking unit 204, in conjunction with the processor 202, may be further configured to compare the first score and the second score to determine the correct tracker and incorrect tracker. In accordance with an embodiment, when the first score is greater the second score, the tracking unit 204, in conjunction with the processor 202, may be configured to determine the first tracker 204a as the correct tracker and the second tracker 204b as the incorrect tracker. In such a case, the tracking unit 204, in conjunction with the processor 202, may be configured to select the first bounding box 502a, as the third bounding box 502c. The tracking unit 204, in conjunction with the processor 202, may be further configured to re-initialize the second tracker 204b. The tracking unit 204, in conjunction with the processor 202, may be configured to extract a template image from the object model update block 304c to re-initialize the second tracker 204b. The second tracker 204b may learn the appearance of the object 112 from the template image.

Figure 6:
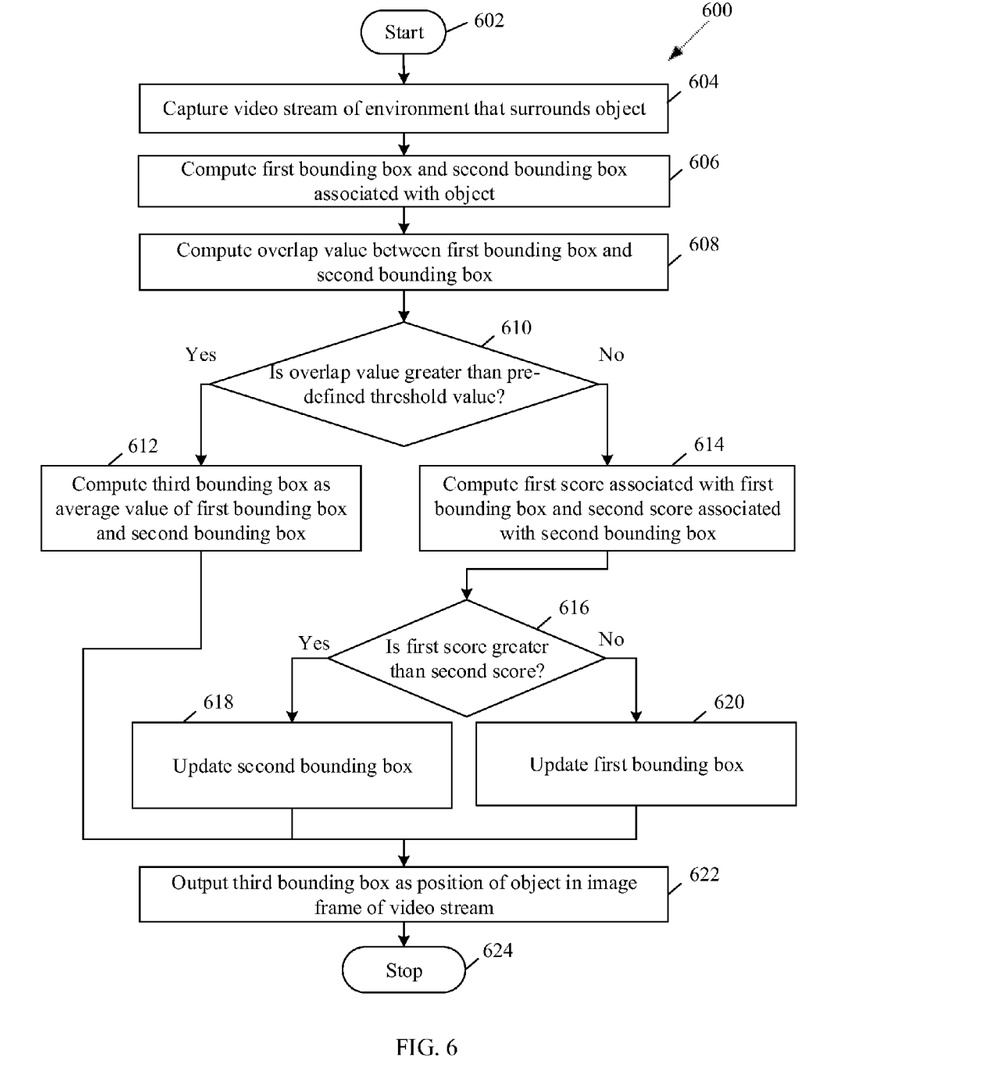
FIG. 6 is a flow chart that illustrates the disclosed method to track an object, in accordance with an embodiment of the disclosure.

FIG. 6 is a flow chart that illustrates a method to track an object, in accordance with an embodiment of the disclosure. With reference to FIG. 6, there is shown a flow chart 600. The flow chart 600 is described in conjunction with FIG. 1 and FIG. 2. The method starts at step 602 and proceeds to step 604.

At step 604, a video stream of an environment that surrounds the object 112, may be captured by the electronic device 102. At step 606, the first bounding box 114a and the second bounding box 114b, may be computed. Further, the computed first bounding box 114a and the computed second bounding box 114b may be associated with the object 112. At step 608, an overlap value between the first bounding box 114a and the second bounding box 114b may be computed.

At step 610, it may be determined whether the determined overlap value is greater than the pre-defined threshold value. In instances when the determined overlap value is greater than the pre-defined threshold value, the control passes to step 612. In instances when the determined overlap value is less than the pre-defined threshold value, the control passes to step 614.

At step 612, the third bounding box 114c may be computed as the average value of the first bounding box 114a and the second bounding box 114b. At step 614, the first score associated with the first bounding box 114a, and the second score associated with the second bounding box 114b, may be computed.

At step 616, it may be determined whether the first score is greater than the second score. In instances when the first score is greater than the second score, the control passes to step 618. At step 618, the third bounding box 114c may be computed as equal to the first bounding box 114a and the second bounding box 114b may be updated. In instances where the first score is not greater than the second score, the control passes to step 620. At step 620, the third bounding box 114c may be computed as equal to the second bounding box 114b and the first bounding box 114a may be updated. At step 622, the third bounding box 114c may be output as the position of the object 112 in the image frame of the video stream. Control passes to end step 624.

In accordance with an embodiment of the disclosure, the system for object tracking may comprise one or more processors in an electronic device, such as the processor 202 (as shown in FIG. 2). The processor 202 may be configured to compute an overlap value between a first bounding box and a second bounding box associated with an object in an image frame of a video stream. The first bounding box may at least partially encompass a first portion of an object. The second bounding box may at least partially encompass a second portion of the object. Further, the first bounding box and the second bounding box may be utilized to track the object in the video stream. The processor 202 may be further configured to compute a first score associated with the first bounding box and a second score associated with the second bounding box, based on a comparison of the computed overlap value with a pre-defined threshold value. The processor 202 may be further configured to update the first bounding box to a new bounding box that may at least partially encompass the object, based on the computed first score and the computed second score.

Various embodiments of the disclosure may provide a non-transitory, computer readable medium and/or storage medium stored thereon, a machine code and/or a computer program with at least one code section executable by a machine and/or a computer to compute an overlap value between a first bounding box and a second bounding box, associated with an object in an image frame of a video stream. The first bounding box may encompass at least a partial first portion of an object. The second bounding box may encompass at least a partial second portion of the object. The first bounding box and the second bounding box may be utilized to track the object in the video stream. Further, a first score associated with the first bounding box and a second score associated with the second bounding box may be computed, based on a comparison of the computed overlap value with a pre-defined threshold value. The first bounding box may be further updated to a new bounding box that may at least partially encompass the object, based on the computed first score and the computed second score.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein.

The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments that fall within the scope of the appended claims.

What is claimed is:

1. A method for object tracking, said method comprising:
    computing, by an electronic device, an overlap value between a first bounding box and a second bounding box, said first bounding box and said second bounding box associated with an object in an image frame of a video stream,
    wherein said first bounding box at least partially encompasses a first portion of said object and said second bounding box at least partially encompasses a second portion of said object, and
    wherein said first bounding box and said second bounding box are utilized to track said object in said video stream;
    computing, by said electronic device, a first score associated with said first bounding box and a second score associated with said second bounding box based on a comparison of said computed overlap value with a threshold value; and
    updating, by said electronic device, said first bounding box to a third bounding box at least partially encompassing said object based on said first score and said second score.

2. The method according to claim 1, further comprising determining an average value of a first set of parameters associated with said first bounding box and a second set of parameters associated with said second bounding box, based on said computed overlap value between said first bounding box and said second bounding box that exceeds said threshold value.

3. The method according to claim 2, wherein said first set of parameters and said second set of parameters comprise at least location information, size information or orientation information.

4. The method according to claim 2, further comprising extracting, by said electronic device, a third portion of said object from said image frame of said video stream corresponding to said determined average value.

5. The method according to claim 4, further comprising updating, by said electronic device, an object model of said object based on content of said third portion.

6. The method according to claim 5, wherein said object model of said object is updated based on a count of instances of said computed overlap value higher than said threshold value by a defined number.

7. The method according to claim 1, further comprising outputting, by said electronic device, said second portion from said image frame of said video stream, based on said computed overlap value between said first bounding box and said second bounding box that is lower than said threshold value and based on said first score that is lower than said second score.

8. The method according to claim 1, wherein said first score associated with said first bounding box is computed based on a motion consistency value between said first bounding box and at least one previous instance of said first bounding box in at least one previous image frame of said video stream.

9. The method according to claim 1, wherein said first score associated with said first bounding box is computed based on a visual similarity value between said object and at least one previous instance of said first bounding box in at least one previous image frame of said video stream.

10. The method according to claim 1, wherein said second score associated with said second bounding box is computed based on a motion consistency value between said second bounding box and at least one of previous instance of said second bounding box in at least one previous image frame of said video stream.

11. The method according to claim 1, wherein said second score associated with said second bounding box is computed based on a visual similarity value between said object and at least one previous instance of said second bounding box in at least one previous image frame of said video stream.

12. The method according to claim 1, wherein said first score and said second score is computed based on said computed overlap value between said first bounding box and said second bounding box that is lower than said threshold value.

13. The method according to claim 12, wherein said first bounding box is updated based on said first score that is lower than said second score.

14. The method according to claim 1, wherein said object is tracked based on at least one attribute of said object, wherein said at least one attribute comprises one of color information of said object or depth information of said object in said image frame.

15. The method according to claim 1, wherein said first bounding box is computed based on a first tracker algorithm.

16. The method according to claim 1, wherein said second bounding box is computed based on a second tracker algorithm.

17. The method according to claim 1, wherein said first portion of said object encompassed by said first bounding box is different from said second portion of said object.

18. The method according to claim 1, wherein said first portion of said object is same as said second portion of said object.

19. A system for object tracking, said system comprising:
    one or more circuits in an electronic device, said one or more circuits configured to:
    compute an overlap value between a first bounding box and a second bounding box, said first bounding box and said second bounding box associated with an object in an image frame of a video stream, wherein said first bounding box at least partially encompasses a first portion of said object and said second bounding box at least partially encompasses a second portion of said object, and wherein said first bounding box and said second bounding box are utilized to track said object in said video stream;

compute a first score associated with said first bounding box and a second score associated with said second bounding box based on a comparison of said computed overlap value with a threshold value; and update said first bounding box to a third bounding box that at least partially encompasses said object based on said computed first score and said computed second score.

20. A non-transitory computer-readable storage medium having stored thereon, computer-executable instructions for causing a computer to execute operations, said operations comprising:

computing, by an electronic device, an overlap value between a first bounding box and a second bounding box, said first bounding box and said second bounding box associated with an object in an image frame of a video stream, wherein said first bounding box at least partially encompasses a first portion of said object and said second bounding box at least partially encompasses a second portion of said object, and wherein said first bounding box and said second bounding box are utilized to track said object in said video stream;

computing, by said electronic device, a first score associated with said first bounding box and a second score associated with said second bounding box based on a comparison of said computed overlap value with a threshold value; and updating, by said electronic device, said first bounding box to a third bounding box at least partially encompassing said object based on said computed first score and said computed second score.

* * * * *